United States Patent [19]

Oetiker

[11] Patent Number: 5,321,879
[45] Date of Patent: Jun. 21, 1994

[54] APPARATUS AND METHOD FOR AUTOMATICALLY INSTALLING AND FASTENING CLAMPS ONTO OBJECTS TO BE FASTENED

[75] Inventor: Hans Oetiker, Horgen, Switzerland

[73] Assignee: Hans Oetiker AG Maschinen- und Apparatefabrik, Switzerland

[21] Appl. No.: 169,034

[22] Filed: Mar. 16, 1988

Related U.S. Application Data

[63] Continuation of Ser. No. 16,794, Feb. 20, 1987, abandoned.

[51] Int. Cl.⁵ .................. B23P 17/00; B21D 53/56
[52] U.S. Cl. ............................ 29/429; 29/450; 29/786; 29/788; 29/790; 901/6; 901/7
[58] Field of Search ............... 29/243.52, 243.56, 429, 29/450, 452, 508, 771, 786, 788, 790, 819; 81/9.3; 72/168, 133, 292, 406, 410, 166, 169, 48; 198/468.2; 414/226, 225; 901/7, 6

[56] References Cited

U.S. PATENT DOCUMENTS

| | | | |
|---|---|---|---|
| 2,738,747 | 3/1956 | Derrick | 29/819 |
| 2,837,949 | 6/1958 | Lodholm | 81/9.3 |
| 3,475,793 | 11/1969 | Oetiker | 81/9.3 |
| 4,003,238 | 1/1977 | Oetiker | 81/9.3 X |
| 4,398,720 | 8/1983 | Jones et al. | 901/6 X |
| 4,425,781 | 1/1984 | Oetiker | 72/384 X |
| 4,633,698 | 1/1987 | Oetiker | 72/168 |
| 4,803,768 | 2/1989 | Golla | 901/6 X |

FOREIGN PATENT DOCUMENTS

| | | | |
|---|---|---|---|
| 1441481 | 5/1966 | France | 72/133 |

*Primary Examiner*—Joseph M. Gorski
*Attorney, Agent, or Firm*—Paul M. Craig, Jr.

[57] ABSTRACT

A method and apparatus for carrying out the method in which a clamp made from a flat blank is plastically deformed into circular shape, is locked in its closed condition, is transferred from the deformation station to a transfer station where it is placed over the object to be fastened and is thereafter tightened onto the object. In order to maintain the clamp in predetermined position on the object before being tightened, the clamp is additionally plastically deformed into a slightly non-circular shape differing from the circular shape of the object and is again elastically deformed into its original circular shape before being placed over the object so that return of the clamp to its slightly non-circular configuration will provide sufficient frictional engagement to hold the clamp in predetermined position.

42 Claims, 5 Drawing Sheets

APPARATUS AND METHOD FOR AUTOMATICALLY INSTALLING AND FASTENING CLAMPS ONTO OBJECTS TO BE FASTENED

This is a continuation application of Ser. No. 016,794, filed Feb. 20, 1987, now abandoned.

FIELD OF THE INVENTION

The present invention relates to a method and apparatus for automatically deforming flat blanks into closed clamps and installing the same over objects to be fastened thereby.

BACKGROUND OF THE INVENTION

Open clamp structures of the type, for example, illustrated in my prior U.S. Pat. No. 4,299,012 which include a so-called "Oetiker" ear have found widespread use in various applications. In one of these applications, such types of open clamps are used on the assembly line in the automobile industry to fasten axle boots onto axles. For that purpose, open clamps which are already preformed into substantially circular configuration are placed about the axle boots, are manually closed by engagement of the hooks provided on the inner band portion in apertures in the outer band portion and are thereafter fastened by contraction of the so-called "Oetiker" ear.

It is also known to ship open clamp structures to the user as flat blanks for space- and cost-saving reasons and to deform the flat blanks into a predetermined shape at the user. My prior U.S. Pat. Nos. 4,633,698 and 4,425,789 disclose machines for preforming the flat blanks at the user.

The manual operations involved heretofore required four persons before the installation of the clamps on the axle boots was completed. Because of human errors, a fifth person was normally present to control for proper installation of the clamp and a sixth person had to be available to remove improperly installed clamps and correct the deficiencies noticed by the control person by installing another clamp in its place. Thus, the prior art method for installing these clamps was relatively labor-intensive. Additionally, the waste was relatively high because the improperly installed clamp structures had to be destroyed in order to remove the same and thus became useless scrap. Apart from normal human errors, the problems in the prior art method were further compounded by lack of uniformity in the installation of the clamps, not only due to improper application of the pincer-like pneumatic tool closing the so-called "Oetiker" ear but also by vastly varying actuation of the pneumatic tool, which in turn resulted in closing of the ear at different speeds and with greatly differing forces. However, for metallurgical reasons, an excessively rapid deformation of the ear and/or excessive closing forces may affect the quality of installation of the installed clamp and its holding ability.

Thus, the prior art method as described above, which has been used on the assembly line in the automotive industry, entailed numerous problems which not only affected cost, but also quality of the installation of the clamp on the axle boot and therewith the length of life of the axle assembly dependent on the ability to retain in an absolutely tight manner the lubricant present on the inside of the axle boot.

SUMMARY OF THE INVENTION

The present invention has as its primary object to eliminate the aforementioned shortcomings and drawbacks encountered in the prior art and to assure a foolproof installation of the clamp structure, which is independent of human errors that cause variations in the quality of the assembled structure.

The underlying problems are solved according to the present invention by a method and apparatus which permits a completely automatic operations including deformation of a flat blank into a circular shape, closing of the clamp, automatically transferring the closed clamp from a deformation station to a transfer station where the clamp is placed over the axle boot, and thereafter contracting the ear in the thus-installed clamp to tighten the clamp structure about the axle boot and thus hold the latter tightly on the axle itself.

According to another feature of the present invention, the clamp is so mounted over the axle boot at the transfer station that it will stay in predetermined position while the thus-assembled axle, axle boot and clamp assembly is moved from the transfer station to the fastening station in order to assure that the pneumatic pincer-like tool can close the ear each time in a completely satisfactory manner owing to the relative fixed position between the ear and the pneumatic tool. This is achieved according to the present invention in that the circular clamp, picked-up at the deformation station is plastically deformed into slightly non-circular, oval shape and before being placed over the axle boot is again elastically deformed back into circular shape so that upon release of the gripping fingers, the clamp will seek to return to its slightly non-circular configuration to thereby assure as a result of the frictional engagement between the clamp and the axle boot that the ear remains in a predetermined position until it is engaged by the pneumatic pincer-like tool.

The machine according to the present invention automatically carries out all of the steps of the method in accordance with the present invention, thus not only entailing significant savings in labor costs, but additionally also assuring a high quality assembly in each instance while eliminating wasteful scrap.

BRIEF DESCRIPTION OF THE DRAWING

These and other objects, features and advantages of the present invention will become more apparent from the following description when taken in connection with the accompanying drawing which shows, for purposes of illustration only, one embodiment of the method and machine in accordance with the present invention, and wherein.

DETAILED DESCRIPTION OF THE INVENTION

Figures 1, 3, 4, 5:
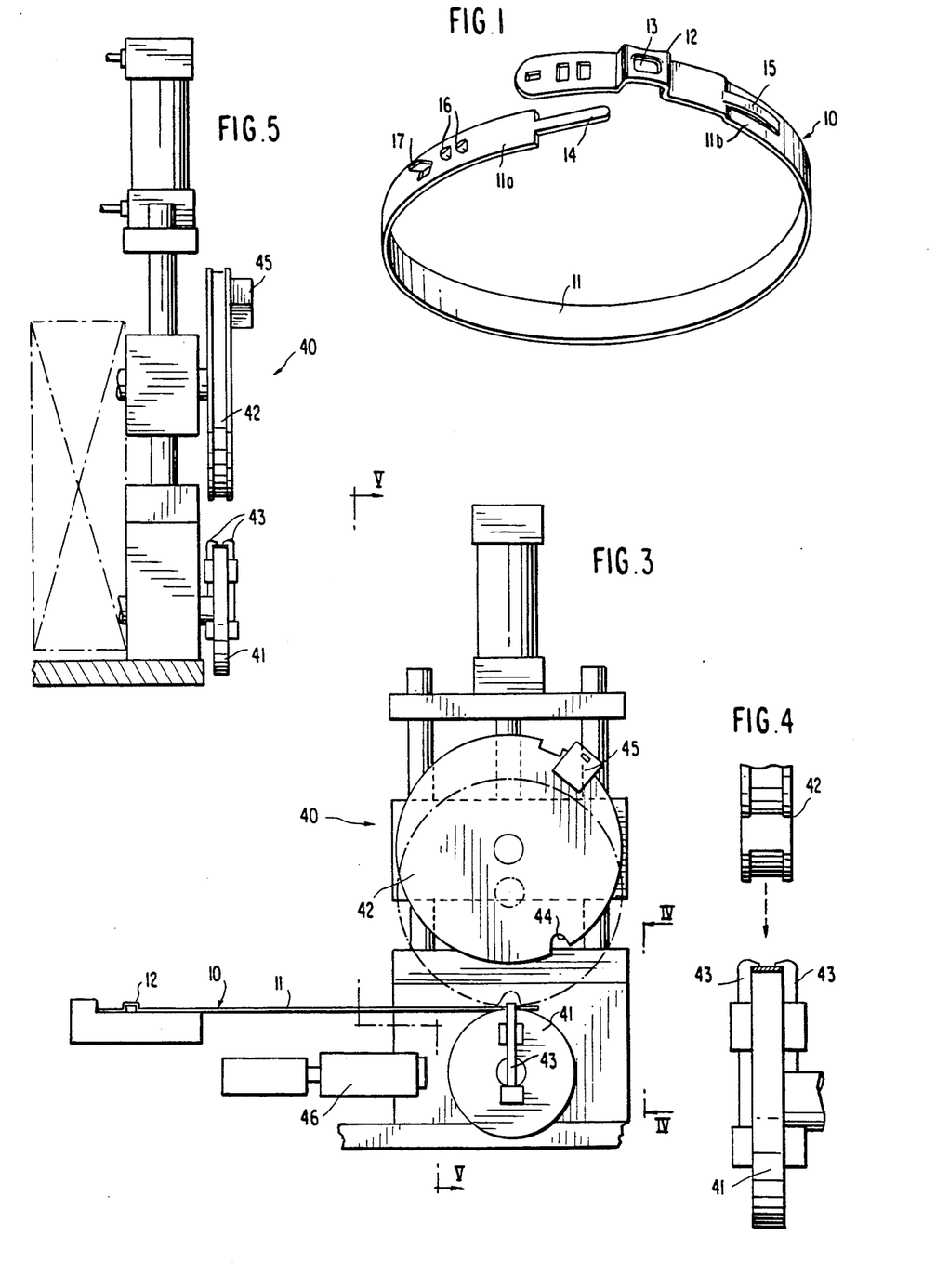
FIG. 1 is a perspective view of the type of clamp which can be used with the machine in accordance with the present invention.
FIG. 3 is a schematic front elevational view of the deformation station in the machine according to the present invention.
FIG. 4 is a partial side elevational view, on an enlarged scale, taken in the direction of arrows IV—IV of FIG. 3.
FIG. 5 is a side elevational view of the machine taken along line V—V of FIG. 3.

Referring now to the drawing wherein like reference numerals are used throughout the various views to designate like parts, and more particularly to FIG. 1, this figure illustrates a clamp of the type shown, for example, in FIG. 7 of my prior U.S. Pat. No. 4,299,012 or as disclosed in my copending application Ser. No. 922,473. The clamp of FIG. 1, generally designated by reference numeral 10, consists of a flat clamping band 11 provided with a so-called "Oetiker" ear 12 which may include one or several reinforcing grooves 13 in the web portion of the ear. To assure a substantially gap-free and stepless transition in the circumferential direction from the inner band portion to the ring-like configuration of the clamp structure, the inner band portion 11a is provided at its free end with a tongue-like extension 14 which is adapted to engage in a complementary recess or aperture constituted by a bent-out embossment 15 provided in the outer band portion 11b, as more fully disclosed in my aforementioned U.S. Pat. No. 4,299,012. Additionally, the inner band portion 11a is provided with one or more cold-deformed hooks 16 as well as with a guide hook 17 which may be a combined guide and support hook extending in the longitudinal direction as shown.

Figure 7:
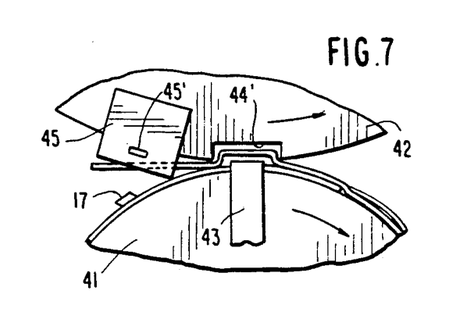
FIG. 7 is a somewhat schematic partial elevational view, illustrating the position of the parts in the course of the deformation operation when the ear has reached the noon position and just prior to the rivet-like closing of the clamp.
Figure 8:
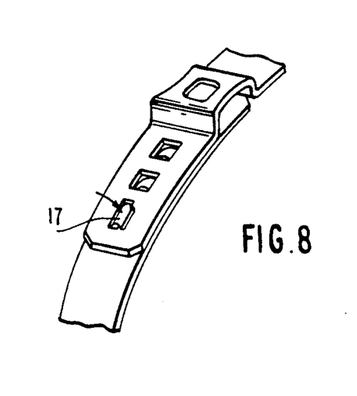
FIG. 8 is a partial perspective view showing the locking action after completion of the deformation of the clamp.

The machine in accordance with the present invention includes a deformation station generally designated by reference numeral 40 (FIGS. 2, 3, 5, 9, 10) which includes a first smaller roller member 41 and a second larger roller member 42 which are adapted to rotate about their respective axes of rotation and are so spaced as to cause feed of the flat blank 30 when it is inserted into the deformation station and triggers a proximity switch (not shown) of conventional construction as will be described more fully hereinafter. The smaller roller member 41 includes a pair of approximately L-shaped clamping members 43 which, when actuated, are adapted to move first radially outwardly over the inserted clamping band 11 and thereafter toward one another with their clamping legs so as to hold the flat blank onto the outer surface of the roller member 41 (FIG. 4). The larger roller member 42 includes a first notch 44 of a shape to permit the clamping members to close over the clamping band at the beginning of the clamping operation and a second notch 44' of a shape complementary to the ear 12 and so spaced along its circumference as to accommodate the ear when it arrives in the noon position of the clamp after a complete rotation of the roller member 41. The larger roller member 42 includes a locking member 45 so positioned and arranged with its camming surface or a slot 45' (FIG. 7) as to cause engagement with the projecting end of the combined guide and support hook 17 in order to provide a positive locking action to hold the clamp closed.

The transfer mechanism generally designated by reference numeral 51 (FIG. 14) includes a pick-up mechanism 55 having four finger-like, approximately L-shaped gripping fingers 56a, 56b, 56c and 56d arranged in two mutually opposite pairs in the noon, 3:00 o'clock, 6:00 o'clock and 9:00 o'clock positions relative to the deformed clamp. The gripping finger 56a in the noon position which is intended to engage the outer clamp surface within the area of the ear 12 is thereby provided with a recess complementary to the shape of the ear so as to accommodate the same therein. The finger members 56a–56d are pivotally supported on the pick-up mechanism 55 by conventional means so as to permit selective closing and opening of the gripping fingers to pick-up a clamp and release the same again. Additionally, the control for the closing and opening of the finger-like members is thereby made in such a manner that they can be actuated selectively in a pair 56a, 56c and 56b, 56d to perform the plastic deformation and elastic deformation as will be described more fully hereinafter.

Figure 14:
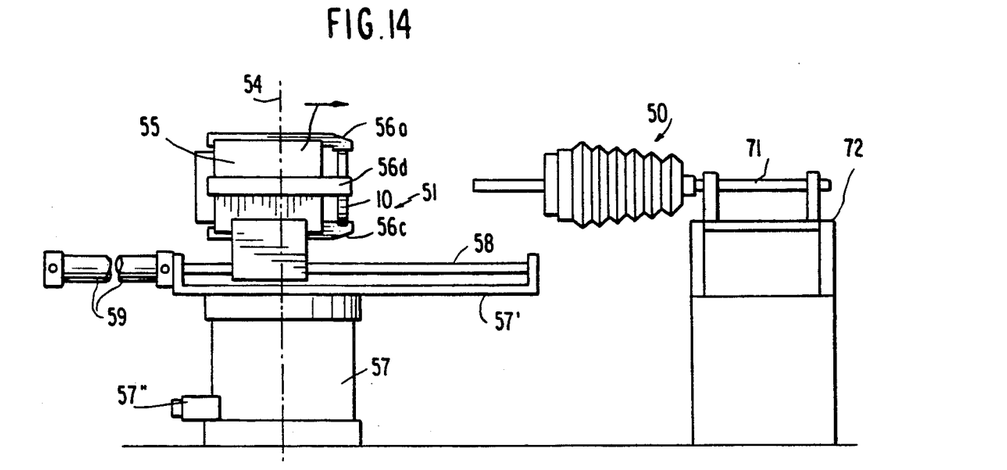
FIG. 14 is a somewhat schematic elevational view illustrating the parts of the machine with the transfer mechanism aligned with the next axle boot and showing the clamp held by the gripping fingers.

The pick-up mechanism 55 is rotatably supported about an axis 54 (FIG. 14) on a relatively fixed support structure 57, the rotation being imparted by conventional means schematically indicated in FIG. 14 by motor 57 which may be drivingly connected by gears or the like with the pick-up mechanism 55. Two support rods 58 serve as guidance for the reciprocating movement of the pick-up mechanism 55 during reciprocating movement in the horizontal direction, as controlled, for example, by the pneumatic cylinder 59 (FIG. 14). The support rods 58 are supported in the U-shaped frame member 57' itself rotatably mounted on the support structure 57 for rotation about the axis 54.

Figures 2, 6:
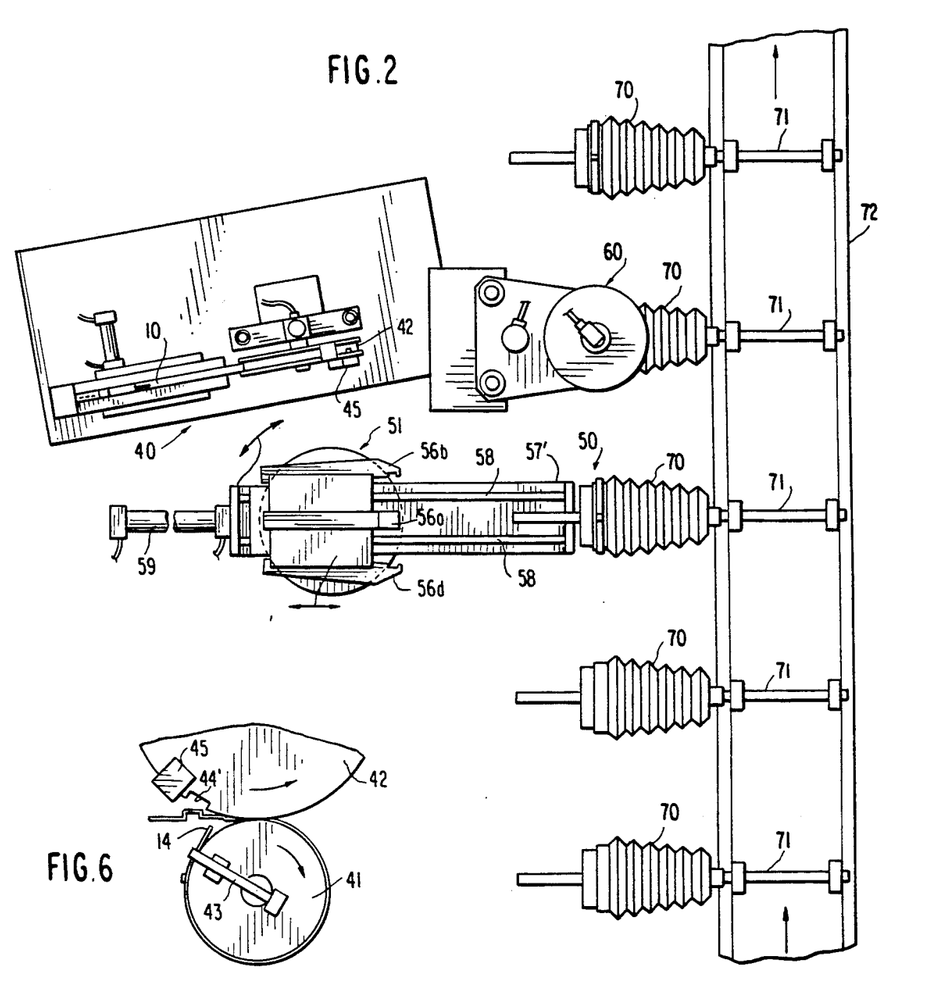
FIG. 2 is a somewhat schematic top plan view on the machine in accordance with the present invention, illustrating the parts just after a clamp has been installed over an axle boot.
FIG. 6 is a somewhat schematic partial elevational view showing the position of the parts just before the ear reaches the noon position in the deformation process.
Figures 15, 16:
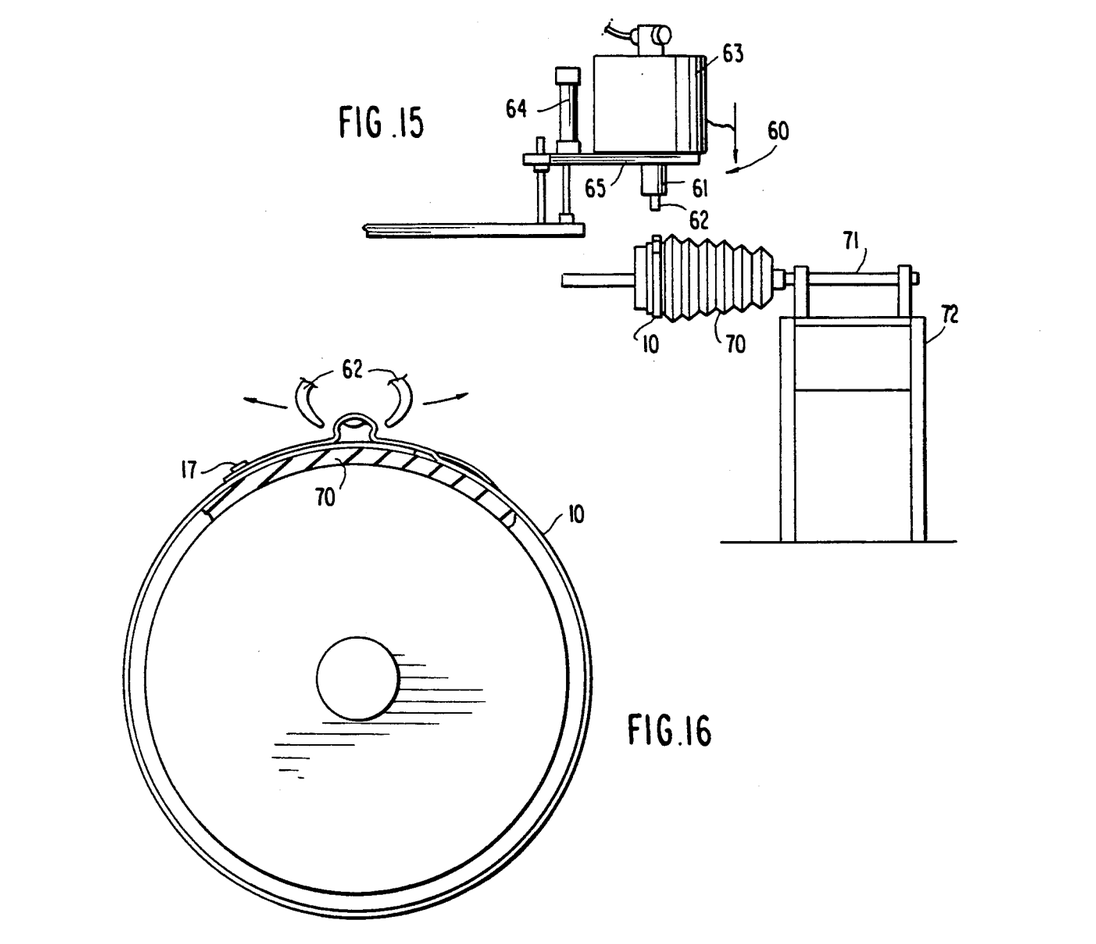
FIG. 15 is a schematic view illustrating the position of the parts at the fastening station just prior to the application of the pneumatic pincer-like tool.
FIG. 16 is a somewhat schematic view illustrating the position of the parts after the ear has been plastically deformed to tighten the clamp onto the axle boot with a predetermined force.
Figure 17:
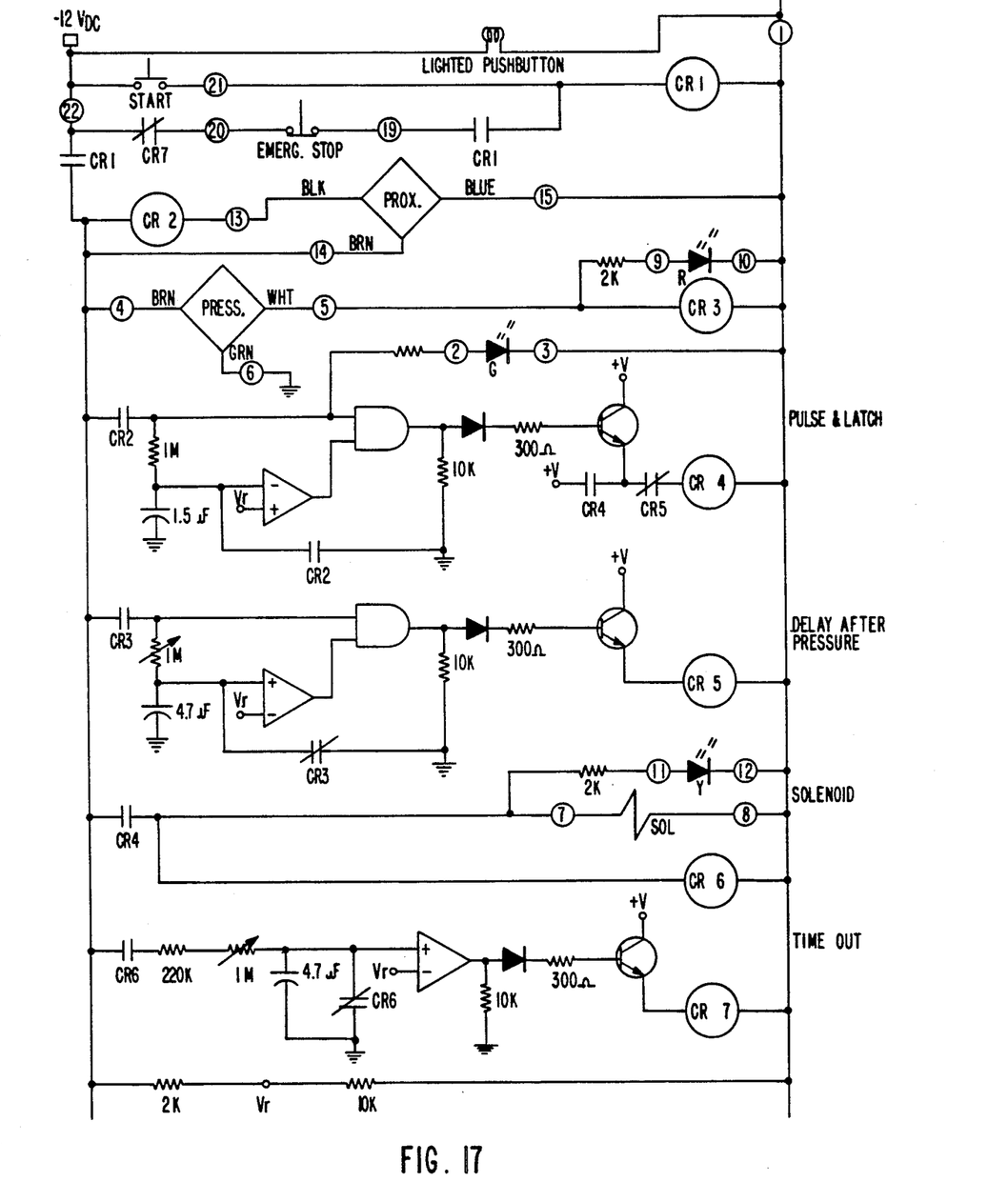
FIG. 17 is a circuit diagram for the control of the pneumatic tool.

The fastening station generally designated by reference numeral 60 (FIG. 15) includes a pneumatic pincer-like tool 61 having pivotally mounted jaws 62 (FIGS. 15 and 16) for plastically deforming the ear 12 to tighten the axle boot 70 onto the axle structure 71 as it is moved along the assembly line 72 (FIGS. 2 and 15). The pneumatic tool 61 includes a control box 63 (FIG. 15) to adjust the speed with which the jaws 62 close and the maximum force with which the clamp is tightened. Additionally, the cycle rate can also be adjusted. FIG. 17 is a schematic diagram showing an electronic circuit which may be contained in the control box 63.

A pneumatic cylinder 64 (FIG. 15) thereby displaces the pneumatic tool assembly 61, 63 and its support 65 in the vertical direction so as to place the jaws 62 accurately over the ear to be deformed. A conventional sensor (not shown) thereby initiates displacement of the pneumatic tool at the right time in relation to the cyclic operation of the machine. Of course, if necessary, appropriate means may also be provided to move the tool, in addition to being moved in the vertical direction, in a horizontal plane, if this should prove necessary.

OPERATION

The operation of the machine in accordance with the present invention is as follows.

When the machine is turned on, ready to operate, but no blank has been inserted as yet, the upper roller member 42 is spaced from the lower roller member 41 as shown in FIGS. 3 and 5. As soon as a flat blank is inserted into the machine, a sensor (not shown) of conventional construction will start the cycle of operation. At that time, the clamping members 43 are still in their retracted position, and the pick-up mechanism 55 faces and is in alignment with the deformation station 40. Initially, the roller member 42 is rotated a slight amount in the clockwise direction as it approaches the roller member 41 so that its notch 44 is in position at the correct time to permit the clamping members to move over the clamping band. As the roller member 41 rotates in the clockwise direction and the roller member 42 in the counter clockwise direction, the flat blank is fed into the machine. The clamping members 43 when actuated, hold the leading edge of the clamping band onto the outer surface of the roller member 41 so as to deform the clamping band as the feed movement continues by rotation of the roller members 41 and 42. The arrangement is thereby made in such a manner that the clamping members 43 engage the clamping band at a point where the full width of the clamping band starts at its leading edge, i.e., behind the tongue-like extension so that the tongue-like extension remains substantially rectilinear until it engages with the outer band portion 11b as the roller member 41 continues to rotate. This offers the advantage that the tongue-like extension is deformed only as it engages in the recess 15 in the outer band portion 11b so that there is sufficient elasticity in the tongue-like extension to assure secure engagement thereof in the recess 15.

Figures 9, 10, 11, 12, 13:
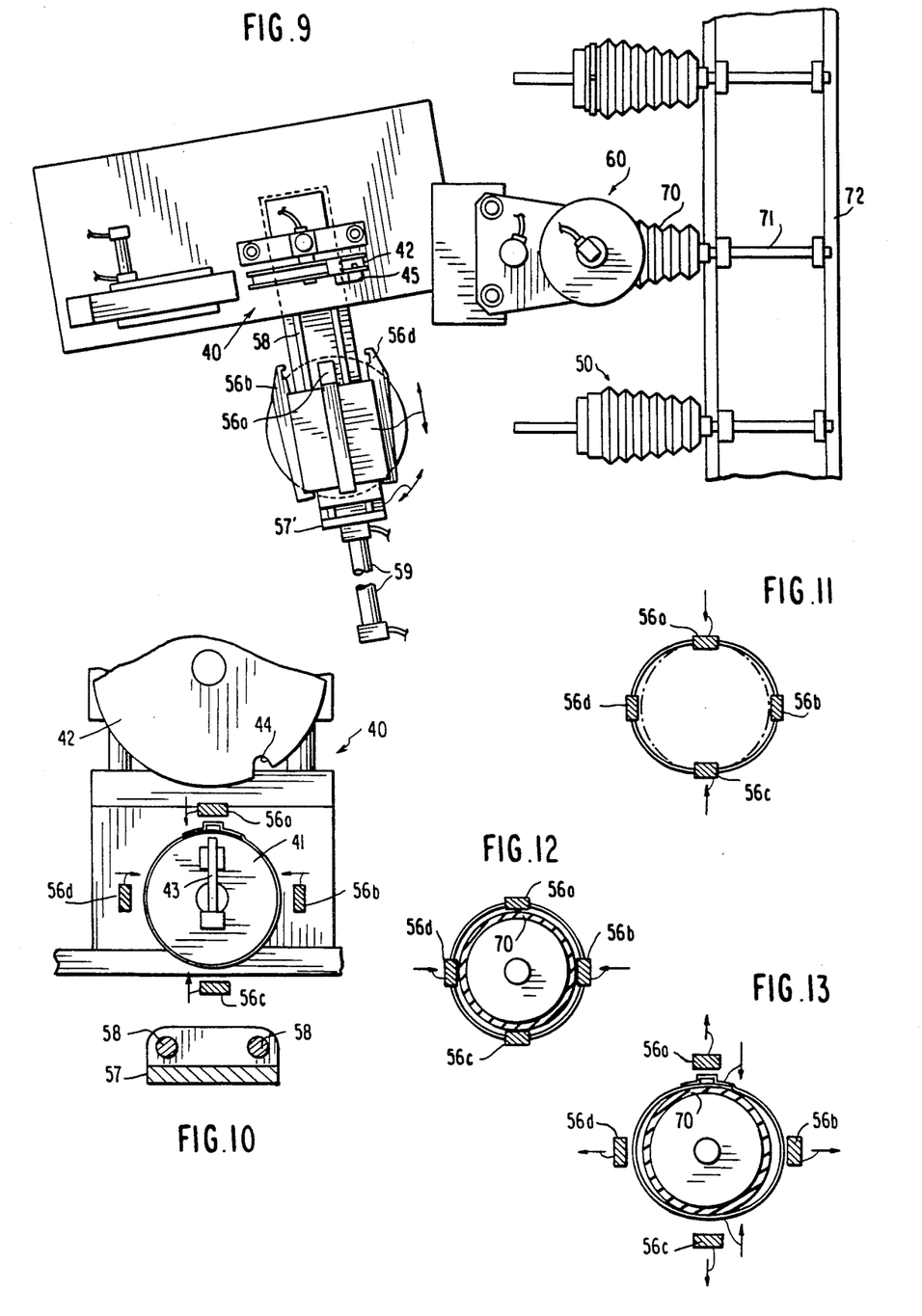
FIG. 9 is a top plan view on the machine, similar to FIG. 2, illustrating the position of the various parts after the axle together with axle boot and clamp mounted over the same have been moved to the fastening station and the transfer mechanism is again in alignment with the deformation station.
FIG. 10 is a partial, somewhat schematic cross-sectional view illustrating the parts at the deformation station after completion of the deformation operation and just prior to pick-up of the deformed clamp by the transfer mechanism.
FIG. 11 schematically illustrates the plastic deformation of the circular clamp into non-circular configuration in the course of the transfer from the deformation station to the transfer station.
FIG. 12 is a somewhat schematic view illustrating the elastic deformation of the clamp into its substantially circular shape just prior to being mounted over the axle boot.
FIG. 13 illustrates the position of the clamp on the axle boot after release by the pick-up finger members, the oval shape of the clamp being illustrated in an exaggerated manner.

The diameter of the parts and location of the second notch 44' are so arranged that the notch 44' will be in a position to receive the ear 12 after the roller member 41 has completed a full revolution. The further rotation of the roller members 41 and 42 causes the locking member 45 to engage with the combined guide and support hook 17 to positively lock the clamp in its closed condition by rivet-like action. This takes place with the ear 12 rotated beyond the noon position so that after completion of the locking action, the roller members 41 and 42 are rotated back through more than 360° to their earlier position in which the ear 12 is in the noon position. The roller member 42 will thereafter be withdrawn from engagement with the clamp so that the latter can slightly expand due to its elasticity and can thus be withdrawn from the deformation station To this end, the pick-up mechanism 55 had been moved toward the deformation station so that the finger members 56a–56d are now in position to engage the outer surface of the deformed clamp as schematically indicated in FIG. 10 where the arrows indicate the pivot movement of these finger members to engage with the deformed clamp. Next, the pick-up mechanism 55 will be retracted, is thereafter rotated until aligned with the transfer station 50 whereupon the pick-up mechanism 55 is again displaced toward the transfer station in such a manner that the clamp is now over the axle boot, ready to be released by disengagement of the finger members 56a–56d.

As it is important that the ear 12 always remains in a predetermined position as the axle assembly moves from the transfer station 50 to the fastening station 60, the present invention also performs two further operations in the course of the transfer of the clamp from the deformation station 40 to the transfer station 50. More particularly, the clamp is plastically deformed into a slightly oval configuration by applying a deformation force to the clamp by way of the finger members 56a and 56c, schematically illustrated in FIG. 11 by the arrow where the non-circular configuration of the clamp is shown in an exaggerated manner. FIG. 12 illustrates how the clamp structure is again deformed into substantially circular shape though only elastically by the application of a force thereto by the finger members 56b and 56d, schematically indicated in FIG. 12 by the arrows. The clamp is then held in frictional engagement with the axle boot 70 as a result of its tendency to return to the non-circular configuration after being released by the finger members 56a–56d as shown again in an exaggerated manner in FIG. 13.

The thus-assembled axle boot and clamp structure is then moved from the transfer station 50 to the fastening station 60 where the pincer-like tool 61 is lowered so that the jaws 62 can engage with the ear 12, held in fixed position relative to the axle boot 70 and thereby assuring every time a completely accurate contraction of the ear and therewith completely satisfactory installation of the clamp structure.

After the clamp is released by the finger members 56a–56d, the pick-up mechanism 55 is again moved away from the transfer station 50, thereafter rotated and aligned with the deformation station in a position ready to pick up the next deformed clamp (FIG. 9) after the next cycle of operation.

As the actuating and drive mechanisms as well as the controls therefor to cause the various movements of the parts of the machine of the present invention, to the extent not shown herein, are known as such, utilizing commercially available and known arrangements, a detailed description thereof is dispensed with herein for the sake of clarity.

Though on the assembly line the axle and axle boot are normally brought into position at the transfer station, are held thereat for a predetermined time, for example, six seconds to permit installation of the clamp and are thereafter moved together with the clamp to the fastening station where the assembly of axle boot and clamp are now held for six seconds to permit contraction of the clamp ear, the present invention is not limited to an intermittently operable assembly line, but can also be used with a continuously moving assembly line by providing appropriate movements of the various parts at the speed of the assembly line. For example, the pick-up mechanism as also the tool may move at a speed and in a direction of the movement of the assembly line to permit installation of the clamp on a continuously movable assembly line.

Furthermore, the present invention is not limited to a clamp provided with an ear, but may also be used, for example, with an earless clamp of the type disclosed in my prior U.S. Pat. No. 4,492,004. All that is necessary is to redesign the roller member 42 to accommodate the various projecting parts and to redesign the pneumatic tool 60 to provide proper closing action of the clamp.

Thus, while I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A machine for automatically installing and fastening a clamp on an object to be fastened by the use of a flat blank, comprising first means at a deformation station for deforming said flat blank into a clamp slightly larger in its internal configuration than the object including locking means for locking the clamp in its closed condition, second means including pick-up means for picking up the closed clamp from said deformation station and for transferring the clamp to a transfer station over the object to be fastened, and third means for tightening the clamp which is held in predetermined position on said object, onto said object to provide clamping forces over substantially the entire circumference thereof.

2. A machine according to claim 1, wherein said first means includes two feed roller means spaced from each other at such a distance in relation to the thickness of the blank as to feed the blank by rotation of the roller means in mutually opposite directions, one of said feed roller means including clamping means for retaining the flat blank onto the surface of said one feed roller means so as to plastically deform the blank about the one feed roller means as the latter rotates, and actuating means for activating said clamping means as the leading portion of the blank passes through the feed roller means and for de-activating the clamping means upon completion of the deformation operation.

3. A machine according to claim 2, for a blank which is provided with complementary means in the inner and outer band portions operable to engage with one another as the blank nears completion of its deformation into a closed clamp, wherein the other feed roller means includes the locking means operable to engage with one of the complementary means to deform the same so as to provide the locking action.

4. A machine according to claim 3, wherein the other feed roller means is larger in diameter than the one feed roller means so that the other feed roller means rotates through less than 360° as the one feed roller means completes its rotation through at least 360°.

5. A machine according to claim 4, wherein said locking means includes camming surfaces producing the locking action.

6. A machine according to claim 5, wherein said complementary means include an outwardly extending hook on the inner band portion operable to engage in an aperture in the overlapping outer band portion as the deformation operation nears its completion, said locking means engaging the hook extending through the aperture and deforming the same to provide a positive locking action.

7. A machine according to claim 6, wherein said hook is a tab-like hook extending substantially in the circumferential direction of the clamp, and wherein said locking means with its camming surfaces twists the projecting part of the hook to provide a rivet-like locking action.

8. A machine according to claim 6, wherein said pick-up means includes several pick-up finger members operable to engage with the outer surface of the clamp at the deformation station upon completion of the deformation operation, a support structure rotatably supporting thereon said pick-up means in such a manner as to enable selective pick-up of the clamp from the deformation station and release thereof at the transfer station, and actuating means operable to close the finger members in their position over the clamp in the deformation station, thereupon causing retraction of the pick-up means while retaining the deformed, closed clamp, thereafter rotating the pick-up means relative to the support structure to face the transfer station, and thereupon displacing the pick-up means so as to place the clamp over the object, and finally causing the clamp to be released by disengagement of the finger members.

9. A machine according to claim 8, wherein said actuating means include pneumatic actuators.

10. A machine according to claim 8, wherein the object to be fastened is substantially circular in its outer surface, wherein said first means plastically deforms the blank into a substantially circular clamp whose diameter is slightly larger than the diameter of the outer surface of the object, and wherein the actuating means of said second means includes control means operable to plastically deform the clamp into a shape slightly non-circular while being transferred from said deformation station to said transfer station and for elastically deforming the slightly non-circular clamp into its original, substantially circular shape before being mounted over the object so that upon release of the thus-deformed clamp the latter is held on the object in predetermined position by frictional engagement with the object.

11. A machine according to claim 10, wherein said pick-up means includes two circumferentially spaced pairs of oppositely disposed finger members, and wherein the last-mentioned plastic deformation of the clamp is realized by selective actuation of one pair of finger members and the elastic deformation by selective actuation of at least the other pair of finger members.

12. A machine according to claim 11, wherein the clamp includes a plastically deformable, approximately U-shaped ear for contracting the clamp, said ear being located in the deformation station in a predetermined position upon completion of the deformation operation, and wherein one finger member of said one pair is so located as to be aligned with the ear and is provided with a recess in which the ear is accommodated.

13. A machine according to claim 12, wherein said third means includes a pincer-like pneumatic tool having jaws adapted to be selectively closed by an actuating mechanism while in engagement with the legs of the ear, and control means in the tool for admitting air under pressure to the actuating mechanism including throttle means for controlling the time required to reach a predetermined closing force of the jaws, and further means for discontinuing the application of air under pressure upon reaching the predetermined force.

14. A machine according to claim 13, wherein said throttle means and said further means are adjustable.

15. A machine according to claim 3, wherein said complementary means include an outwardly extending hook on the inner band portion operable to engage in an aperture in the overlapping outer band portion as the deformation operation nears its completion, said locking means engaging the hook extending through the aperture and deforming the same to provide a positive locking action.

16. A machine according to claim 15, wherein said hook is a tab-like hook extending substantially in the circumferential direction of the clamp, and wherein said locking means with its camming surfaces twists the projecting part of the hook to provide a rivet-like locking action.

17. A machine according to claim 2, wherein the clamp includes at its leading end a tongue-like extension for engagement in a recess means in a corresponding part of the clamp to provide a stepless clamp, and wherein said clamping means engages the clamping band of the blank in the area following the inner end of the tongue-like extension so that the tongue-like extension is plastically deformed only after it engages with the outer band portion to thereby provide an outwardly directed elasticity in the tongue-like extension assuring good engagement in the recess.

18. A machine according to claim 1, wherein said pick-up means includes several pick-up finger members operable to engage with the outer surface of the clamp at the deformation station upon completion of the deformation operation, a support structure rotatably supporting thereon said pick-up means in such a manner as to enable selective pick-up of the clamp from the deformation station and release thereof at the transfer station, and actuating means operable to close the finger members in their extended position over the clamp in the deformation station, thereupon causing retraction of the pick-up means while retaining the deformed, closed clamp, thereafter rotating the pick-up means relative to the support structure to face the transfer station, and thereupon moving the pick-up means so as to place the clamp over the object, and finally causing the clamp to be released by disengagement of the finger members.

19. A machine according to claim 1, wherein the object to be fastened is substantially circular in its outer surface, wherein said first means plastically deforms the blank into a substantially circular clamp whose diameter is slightly larger than the diameter of the outer surface of the object, and wherein the second means includes control means operable to plastically deform the clamp into a shape slightly non-circular while being transferred from said deformation station to said transfer station and for elastically deforming the slightly non-circular clamp into its original, substantially circular shape before being mounted over the object so that upon release of the thus-deformed clamp the latter is held on the object in predetermined position by frictional engagement with the object.

20. A machine according to claim 19, wherein said pick-up means includes two pairs of oppositely disposed finger members disposed approximately at right angle, and wherein the last-mentioned plastic deformation of the clamp is realized by selective actuation of one pair of finger members and the elastic deformation by selective actuation of the other pair of finger members.

21. A machine according to claim 20, wherein the clamp includes a plastically deformable, approximately U-shaped ear for contracting the clamp, said ear being located in the deformation station in a predetermined position upon completion of the deformation operation, and wherein one finger member of said one pair is so located as to be aligned with the ear and is provided with a recess in which the ear is accommodated.

22. A machine according to claim 1, wherein said third means includes a pincer-like pneumatic tool having jaws adapted to be selectively closed by an actuating mechanism while in engagement with the legs of the ear, and control means in the tool for admitting air under pressure to the actuating mechanism including throttle means for controlling the time required to reach a predetermined closing force of the jaws, and further means for discontinuing the application of air under pressure upon reaching the predetermined force.

23. A machine according to claim 22, wherein said throttle means and said further means are adjustable.

24. A method of automatically installing and fastening a clamp made from a flat blank onto an object of predetermined configuration, comprising the step of deforming the flat blank into a clamp having an internal configuration slightly larger than the configuration of the object, locking the thus-deformed clamp in closed condition, picking-up the thus-deformed and closed clamp from the deformation station to a transfer station where it is placed over the object to be fastened, and tightening the clamp over the object to be fastened.

25. A method according to claim 24, further comprising the steps of plastically deforming the clamp into a shape slightly different from that of the configuration of the object while being transferred from the deformation station to the transfer station and elastically deforming the clamp again into its original configuration before being released over the object to be fastened so that the clamp is retained on the object in predetermined position by frictional engagement with the object until the clamp is tightened on the object.

26. A method according to claim 25, wherein the clamp is fastened onto the object by the relatively slow application of a tightening force up to a predetermined amount.

27. A method according to claim 26, wherein the object has a substantially circular configuration and the clamp is plastically deformed during its transfer from the deformation station to the transfer station from its original, substantially circular configuration into a slightly oval configuration and is again elastically deformed prior to being placed over the object at the transfer station into its original circular configuration so that the clamp is frictionally held in predetermined position on the object when seeking to return to its slightly oval configuration.

28. A method according to claim 24 on an assembly line, in which the object to be fastened is moved along the assembly line to the transfer station, is stopped in the transfer station to permit mounting of the clamp over the object and is thereafter moved from the transfer station to a fastening station where it is stopped again to permit tightening of the clamp over the object.

29. A method according to claim 24, wherein the object is carried along a continuously moving assembly line, and wherein the clamp is placed over the object while moving along the transfer station and is thereafter tightened while moving along in the area of the fastening station.

30. A transfer device for transferring a closed clamp from a deformation station to an object to be fastened thereby, comprising pick-up means having several pick-up finger members operable to engage with the outer surface of the clamp at the deformation station upon completion of the deformation operation, a support structure rotatably supporting thereon said pick-up means in such a manner as to enable selective pick-up of the clamp from the deformation station and release thereof over the object to be fastened, and actuating means operable to close the finger members in their position over the clamp in the deformation station, thereupon causing retraction of the pick-up means while retaining the deformed, closed clamp, thereafter rotating the pick-up means relative to the support structure to face the object to be fastened, thereupon mounting the clamp over the object, and finally causing the clamp to be released by disengagement of the finger members.

31. A transfer device according to claim 30, wherein the object to be fastened is substantially circular in its outer surface, wherein the closed clamp is substantially circular in shape whose diameter is slightly larger than the diameter of the outer surface of the object, and wherein the actuating means includes control means operable to plastically deform the clamp into a shape slightly non-circular while being transferred from said deformation station to said object and for elastically deforming the slightly non-circular clamp into its original, substantially circular shape before being mounted over the object so that upon release of the thus-deformed clamp the latter is held on the object in predetermined position by frictional engagement with the object.

32. A transfer device according to claim 31, wherein said pick-up means includes two circumferentially spaced pairs of oppositely disposed finger members, and wherein the last-mentioned plastic deformation of the clamp is realized by selective actuation of one pair of finger members and the elastic deformation by selective actuation of at least the other pair of finger members.

33. A transfer device according to claim 30, wherein the pick-up means engages with the outer surface of the closed clamp at a fixed location in the deformation station, and wherein the actuating means actuates the support structure and the pick-up means rotatably supported thereon to transfer the closed clamp from the fixed location in the deformation station to a fixed location where the object to be fastened is located.

34. A transfer device according to claim 33, wherein the pick-up finger members are spaced circumferentially about the closed clamp and are operable to securely retain the picked-up closed clamp by radially inwardly directed pressure.

35. A transfer device according to claim 30, wherein the pick-up finger members are spaced circumferentially about the closed clamp and are operable to securely retain the picked-up closed clamp by radially inwardly directed pressure.

36. A deformation machine for deforming a flat blank into a closed clamp, comprising two feed roller means normally spaced from each other at such a distance in relation to the thickness of the blank as to feed the blank by rotation of the roller means in mutually opposite directions, one of said feed roller means including clamping means rotatable with said one feed roller means for retaining the leading edge area of the flat blank onto the surface of said one feed roller means so as to plastically deform the blank about the one feed roller means during continued rotation of the feed roller means, means for mechanically connecting the ends of the blank as the plastic deformation thereof nears completion, and actuating means for automatically activating said clamping means as the leading portion of the blank passes through the feed roller means to thereby clamp the leading portion of the blank onto the surface of said one feed roller means and for de-activating the clamping means upon completion of the deformation operation.

37. A transfer device for transferring a closed clamp made of flat clamping band material from a deformation station to an object to be fastened thereby, comprising pick-up means having several circumferentially spaced pick-up finger members operable to engage with the outer clamping band surface of the clamp at the deformation station upon completion of the deformation operation to thereby securely grip the closed clamp by circumferentially spaced, inwardly directed pressure on the outer clamping band surface, a support structure rotatably supporting thereon said pick-up means in such a manner as to enable selected pick-up of the closed clamp from the deformation station and release thereof in the closed condition over the object to be fastened, and actuating means operable to close the finger members in their position over the closed clamp in the deformation station, thereupon causing retraction of the pick-up means while retaining the deformed closed clamp, thereafter rotating the pick-up means relative to the support structure to face the object to be fastened, thereupon mounting the closed clamp over the object by displacement of the closed clamp generally in the clamp's axial direction, and finally causing the clamp to be released by disengagement of the finger members from the closed clamp mounted over the object to be fastened thereby.

38. A transfer device according to claim 37, wherein more than two finger members are circumferentially arranged about the clamp to be gripped thereby so as to equalize the forces exerted by the finger members on the outer clamping band surface with the clamp in the closed condition.

39. A transfer device according to claim 38, wherein four circumferentially substantially equally spaced finger members are used.

40. A transfer device according to claim 37, wherein the finger members are operable to move essentially in the radial direction of the closed clamp to engage with the outer clamping band surface or disengage therefrom to release the clamping band.

41. A transfer device according to claim 37, wherein the finger members engage exclusively with the outer clamping band surface to provide gripping action.

42. A transfer device according to claim 37, wherein said finger members are operable to grip the closed clamp exclusively by generally radially inwardly directed forces engaging with the outer clamping band surface.

* * * * *